United States Patent [19]

Castano

[11] Patent Number: 5,060,907

[45] Date of Patent: Oct. 29, 1991

[54] BASE FOR AN UMBRELLA

[75] Inventor: Francisco Castano, Novi, Mich.

[73] Assignee: Unistrut Corporation, Ann Arbor, Mich.

[21] Appl. No.: 464,036

[22] Filed: Jan. 12, 1990

[51] Int. Cl.$^5$ .......................................... F16M 13/00
[52] U.S. Cl. ..................................... 248/514; 248/536
[58] Field of Search ............... 248/514, 515, 516, 520, 248/519, 534, 536, 541, 163.2, 164, 188.7; 136/16; 52/116, 119, 120, 298

[56] References Cited

U.S. PATENT DOCUMENTS

| | | | |
|---|---|---|---|
| 2,667,317 | 1/1954 | Trebules | 248/154 |
| 2,687,863 | 8/1954 | Vogt et al. | 52/120 X |
| 2,755,049 | 7/1956 | Curtiss | 248/515 |
| 2,875,968 | 3/1959 | Ekola | 248/515 X |
| 3,602,188 | 8/1971 | Penaflor | 248/514 X |
| 3,729,157 | 4/1973 | Haff | 248/519 X |
| 3,966,151 | 6/1976 | Hawkins, III | 248/536 X |
| 4,582,287 | 4/1986 | DeLeary | 248/519 |

Primary Examiner—Ramon O. Ramirez
Attorney, Agent, or Firm—Dykema Gossett

[57] ABSTRACT

A base for an umbrella and the like includes four legs set at substantially ninety degree angles with respect to one another and a tiltable umbrella pole receptacle. The four legs are restable upon a planar surface such as the ground or pavement. The legs are interconnected by tension rods whereby a first pair of adjacent legs are adjoined by a first tension rod, a second pair of adjacent legs are adjoined by a second tension rod, a third pair of adjacent legs are adjoined by a third tension rod, and a fourth pair of adjacent legs are adjoined by a fourth tension rod. The receptacle is pivotably mounted to the legs whereby the angle of the umbrella pole may be altered relative to the surface upon which the base is set at rest. The receptacle may be locked into a selected angle by a pair of adjustment rods fixed to two of the legs.

20 Claims, 2 Drawing Sheets

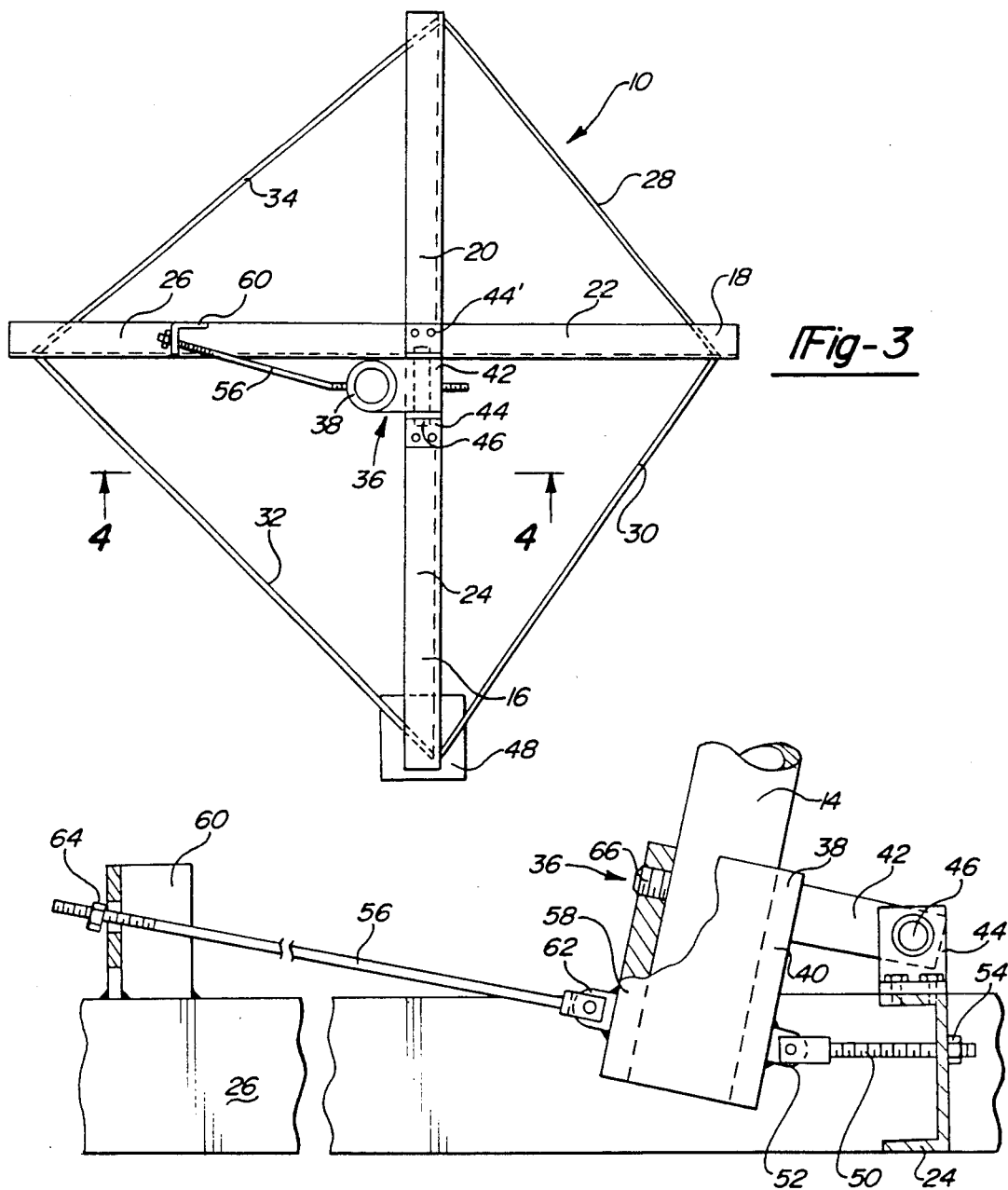

BASE FOR AN UMBRELLA

BACKGROUND OF THE INVENTION

I. Field of the Invention

The present invention relates generally to bases for supporting umbrellas. More particularly, the present invention relates to a base for supporting umbrellas of large proportions where the angle of the umbrella pole may be altered and selectively fixed to a preferred degree.

II. Description of the Relevant Art

The use of umbrellas to keep rain or excess solar heat off of the individual is well known. These umbrellas are provided in a grand variety of shapes, sizes and colors.

The principle employed in keeping rain and heat off of the individual by use of an individual's umbrella is also shared in the application for use of relatively large umbrellas above picnic tables, on beaches and in some commercial applications. Such large umbrellas are also provided in a variety of shapes, sizes and colors. The most significant difference between these umbrellas and those used by the individual also include structural differences such as the employment of stronger materials such as heavy duty fabric and heavy duty poles and connecting rods.

However, of all the consideration given the large umbrella itself, relatively little attention has been paid to the very important base for such a large object. Very often these bases are merely massive anchors having a pole-receiving aperture defined therein.

Such bases are of very limited utility. They are not convenient to transport because of their significant mass They are unifunctional in that they only allow the inserted pole to stand up in one fixed perpendicular position.

The latter difficulty significantly compromises the most important purpose of the umbrella which is to keep rain and heat off of the user. Because the user or users cannot alter the angle of the umbrella to best effect its purpose because of the fixed angle of the pole-receiving recess, the umbrella cannot fully be used to execute its purpose.

Furthermore, when high winds arise, known umbrellas are generally unable to deal well with the gusts because they are incapable of withstanding the strain and cannot be retracted into a position that avoids excessive drag.

To overcome this defect, umbrella manufacturers have included in some poles a pivoting joint. However, this joint structure not only negatively impacts upon the integrity of the pole itself, but also only minimally improves on protecting the individual or individuals, because the selected pitch of the umbrella is not directed significantly to the incoming rain or sunshine.

Accordingly, prior approaches to providing effective bases for large umbrellas have failed to maximize the utility of the invention and only partially provide an answer to the need of an improved umbrella base.

SUMMARY OF THE PRESENT INVENTION

The present invention provides a base for a large umbrella having a diameter of at least twenty feet that is easily assembled and is of light weight while being of considerable strength. The base according to the present invention further allows the umbrella pole to be selectively angled at the base itself, thereby obviating the need for a pivoting elbow in the umbrella pole.

The base includes four intersecting legs. The legs are provided substantially at right angles to one another. The legs themselves are made up of a pair of elongated members that are fastenable to one another thereby resulting in four distinct legs. The elongated members are preferably approximately ten feet long and are structured in the shape of a channel to maximize the strength of the legs. The channel is preferably approximately eight inches wide. Other umbrella dimensions require different base dimensions as required by structural calculations.

The elongated members are preferably composed of a light weight material such as aluminum. The interconnecting of the members is done simply by bolting them together, and this may be done in any convenient location such as in the work field. Once attached to one another, each pair of adjacent legs is interconnected by a tension rod. For additional stability, the outward end of each leg may be provided with a planar support plate at its underside. Preferably on the legs is attached the pole receptacle. The length of two adjacent legs opposite the adjacent legs within which the receptacle is provided are shorter than the adjacent legs of the receptacle so that the center of the receptacle is provided approximately at the center of the base when considered in plan view.

The receptacle includes a first hinging arm attached thereto. The selected legs for attachment include a pair of second hinging arm attached to their approximate top side. The first and second hinging arms are pivotably joined by a hinge pin. The construction allows for substantial pivoting capacity of the first hinging arm relative to the second hinging arm.

The receptacle includes a front portion and a back portion. The first hinging arm is fixed to the upper end of the receptacle on its approximate back portion. Adjustably interconnecting the back portion of the receptacle and the leg to which the receptacle is hingedly interconnected is a first adjustable rod. Adjustably interconnecting the front portion of the receptacle and the leg adjacent to the receptacle is a second adjustable rod. The first and second adjustable rods may be selectively adjusted to achieve a preferable angle for the receptacle and hence the pole of the umbrella.

To keep the umbrella pole fixed within the receptacle, a set screw is employed, although other methods of attachment may be preferably employed.

Because of its overall light weight and ease of Construction, the base according to the present invention may be easily moved and assembled at a selected site. Because of its sturdy construction, the base according to the present invention may be used for large umbrellas over long periods of application. And because of the adjustability of the receptacle, the umbrella of the present invention may be angled to maximize its effectiveness at keeping rain and sun off of the individuals seeking its protection.

Other advantages and features of the present invention will become apparent from the following detailed description when read in conjunction with the accompanying drawing.

BRIEF DESCRIPTION OF THE DRAWING

The present invention will become more fully understood by reference to the following detailed description of the preferred embodiment of the present invention when read in conjunction with the accompanying drawing, in which like reference characters refer to like parts throughout the views and in which:

FIG. 3 is a top plan view of the base according to the present invention; and

FIG. 4 is a partially sectional view taken along line 4—4 of FIG. 3 illustrating the umbrella pole receptacle of the present invention in detail.

DETAILED DESCRIPTION OF THE PREFERRED EMBODIMENT OF THE PRESENT INVENTION

Figure 1:
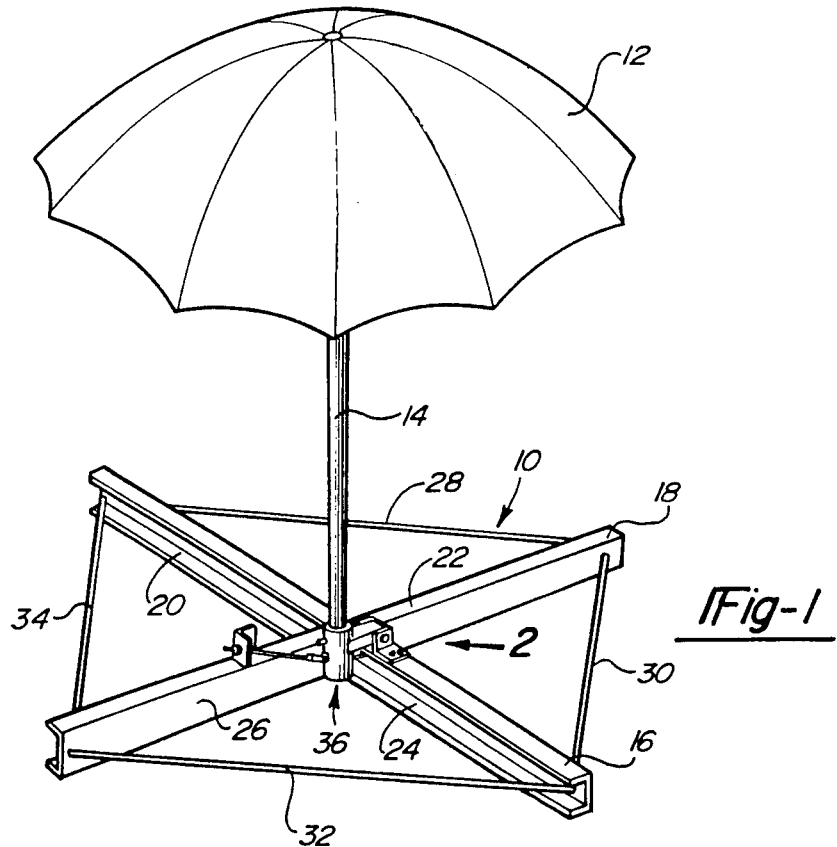
FIG. 1 is a perspective view of the base according to the present invention with an umbrella fitted thereto.

The drawing discloses the preferred embodiment of the present invention. While the configuration according to the illustrated embodiment is preferred, it is envisioned that alternate configurations of the present invention may be adopted without deviating from the invention as portrayed. The preferred embodiment is discussed hereafter.

Referring to FIG. 1, a perspective view of the umbrella base, generally indicated as 10, is illustrated, with an umbrella 12 fitted thereto. The umbrella 12 includes an umbrella pole 14.

The base 10 includes a pair of intersecting, channel-shaped members 16, 18. The members 16, 18 are interconected by conventional fasteners such as nuts and bolts (not illustrated). In their interconnected position, the members 16, 18 define four legs, 20, 22, 24, 26. The legs 20, 22, 24, 26 are preferably fixed at right or ninety-degree angles with respect to each other. The legs 20, 22, 24, 26 are interconnected by a number of tension rods 28, 30, 32, 34 whereby legs 20, 22 are interconnected by the tension rod 28; legs 22, 24 are interconnected by the tension rod 30; legs 24, 26 are interconnected by the tension rod 32; and legs 26, 20 are interconnected by the tension rod 34. The tension rods 28, 30, 32, 34 add a significant measure of strength and stability to the base 10.

Located approximately at the center of the base 10 (when viewed in plan view; see FIG. 3) is a pole receptacle assembly, generally indicated as 36. The assembly is more fully and clearly described by reference to FIG. 2.

Figure 2:
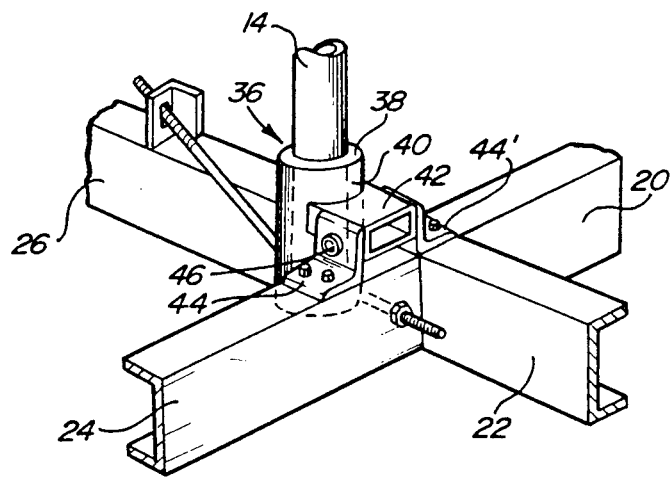
FIG. 2 is a view taken from view 2 of FIG. 1.

FIG. 2 illustrates a partially sectioned close-up view taken from the view illustrated by 2 in FIG. 1. This view illustrates a receptacle 38 for removably receiving the pole 14. The receptacle 38 includes a back portion 40 to which a first hinging arm 42 is fixedly attached. A pair of second hinging arms 44, 44' are fixedly attached to the top sides of legs 24, 20. Pivotably interconnecting the first hinging arm 42 and the pair of second hinging arms 44, 44' is a hinge pin 46. Of course, other related methods of providing hinging action between the receptacle 38 and the legs 20, 22, 24, 26 may be employed while still resulting in the preferred hinging action.

Referring to FIG. 3, a top plan view of the base 10 is illustrated and shows well the preferred centralized location of the receptacle 38. The central location of the receptacle 38 is achieved by interlocking the members 16, 18 so that legs 24, 26 are longer than legs 20, 22.

To enhance the overall stability of the base 10, a planar support plate 48 may be fixed to the bottom side of each of the legs 20, 22, 24, 26 at their approximate end regions.

With reference to FIG. 4, a partially sectioned view taken along line 4—4 of FIG. 3 is shown illustrating in detail the receptacle assembly 36. As illustrated, the receptacle 38 (and, hence, the pole 14) is fixed at approximately a 78° angle relative to the longitudinal axis of the leg 26. Of course, greater or lesser angles may be achieved as preferred.

To lock the receptacle 38 at the preferred angle, a first adjustment rod 50 is provided between the back portion 40 of the receptacle 38 and the leg 24. The rod 50 is pivotably attached to the back portion 40 by a first pivotable assembly 52. Adjustment of the rod 50 is taken up by a first adjusting nut 54.

In opposition to the adjustment of the, first adjustment rod 50 is a second adjustment rod 50 fitted between a front portion 58 of the receptacle 38 and a bracket 60 provided on the top side of the leg 26. The rod 56 is pivotally attached to the front side 58 of the receptacle 38 by a second pivotable assembly 62. A second adjusting nut 64 is provided to take up adjustment of the rod 56. The tension created by tightening adjustment on the rods 50, 56 effects locking of the receptacle 38 at the desired angle.

The pole 14 is preferably releasably mounted within the receptacle 38 by a locking set screw 66.

Having described my invention, however, many modifications thereto will become apparent to those skilled in the art to which it pertains without deviation from the spirit of the invention as defined by the scope of the appended claims.

I claim:

1. A base for an umbrella, said umbrella including an umbrella pole, said base comprising:

at least four intersecting and substantially horizontal legs; and at least one receptacle for removably receiving said umbrella pole, said receptacle being pivotally mounted to one or more of said at least four intersecting legs;

whereby said pivotable mounting provides for the alteration of the degree of angle of said receptacle relative to said horizontal legs about a pivot axis, and locking means comprising at least a first member movable relative to an axially extending second member to lock said receptacle at a given angle, said second member extending along an axis which is non-parallel to said pivot axis such that said locking means prevents pivoting of the receptacle.

2. The base for an umbrella of claim 1 wherein each of said four intersection legs are substantially at ninety degree angles to each other.

3. The base of an umbrella of claim 1 wherein two adjacent legs of said four intersecting legs are longer relative to the two other of said four intersecting legs.

4. The base for an umbrella of claim 1 wherein each of said legs includes a top side and a bottom side, said bottom sides each being fitted with a substantially planar support plate.

5. The base for an umbrella of claim 1 wherein each of said intersecting legs is substantially channel-shaped.

6. The base for an umbrella of claim 1 wherein said base further includes means for locking said receptacle at a selected degree of angle.

7. The base for an umbrella of claim 6 wherein said receptacle includes a front region and a back region.

8. The base for an umbrella of claim 1 wherein said receptacle further includes a means for locking said pole of said umbrella in place.

9. The base for a umbrella of claim 8 wherein said means for locking comprises a set screw.

10. A base for an umbrella as recited in claim 1, wherein said first member is a nut and said second member is a threaded bolt.

11. A base for an umbrella, said umbrella including an umbrella pole, said base comprising:
- a least four intersecting and substantially horizontal legs; and
- at least one receptacle for removably receiving said umbrella pole, said receptacle being pivotally mounted to one or more of said at least four intersecting legs;
- whereby said pivotable mounting provides for the alteration of the degree of angle of said receptacle relative to said horizontal legs, and wherein said intersecting legs are interconnected by a plurality of tension rods.

12. A base for an umbrella, said umbrella including an umbrella pole, said base comprising:
- a least four intersecting and substantially horizontal legs; and
- at least one receptacle for removably receiving said umbrella pole, said receptacle being pivotally mounted to one or more of said at least four intersecting legs;
- whereby said pivotable mounting provides for the alteration of the degree of angle of said receptacle relative to said horizontal legs, and wherein two adjacent legs of said four intersecting legs are longer relative to the other two of said four intersecting legs, said four intersecting legs defining four quadrants between each of said legs and an adjacent one of said legs, and said receptacle is situated approximately at the center of said base, such that said receptacle is received in a quadrant which is defined between said two adjacent legs which are longer.

13. A base for an umbrella, said umbrella including an umbrella pole, said base comprising:
- a least four intersecting and substantially horizontal legs; and
- at least one receptacle for removably receiving said umbrella pole, said receptacle being pivotally mounted to one or more of said at least four intersecting legs;
- whereby said pivotable mounting provides for the alteration of the degree of angle of said receptacle relative to said horizontal legs, said receptacle includes a first hinging arm assembly fixed thereto.

14. The base for an umbrella of claim 13 wherein at least one of said four legs includes a second hinging arm assembly fixed thereto.

15. The base for an umbrella of claim 14 wherein said second hinging arm assembly is fixed to a top side of said at least one of said four legs.

16. The base for an umbrella of claim 15 wherein said first hinging arm assembly and said second hinging arm assembly are hingedly interattached by a hinge pin.

17. A base for an umbrella, said umbrella including an umbrella pole, said base comprising:
- a least four intersecting and substantially horizontal legs; and
- at least one receptacle for removably receiving said umbrella pole, said receptacle being pivotally mounted to one or more of said at least four intersecting legs;
- whereby said pivotable mounting provides for the alteration of the degree of angle of said receptacle relative to said horizontal legs, wherein said base further includes means for locking said receptacle at a selected degree of angle, and wherein said receptacle includes a front region and a back region, said means for locking said receptacle comprises a first adjustable rod interconnecting said back portion of said receptacle and said at least one of said four legs to which said second hinging arm assembly is fixed.

18. The base for an umbrella of claim 17 wherein said means for locking said receptacle further comprises a adjustable rod interconnecting said front region of said receptacle and one of four legs adjacent said at least one of four legs to which said first adjustable rod is attached.

19. A base for an umbrella, said umbrella including an umbrella pole, said base comprising:
- a pair of intersecting elongated members, said members each having a top side and a bottom side;
- a first receptacle pivoting portion fixed to one or more of said pair of intersecting elongated members;
- a second receptacle pivoting portion pivotably attached to said first receptacle pivoting portion; and
- a receptacle for removably receiving said umbrella pole attached to said second receptacle pivoting portion.

20. The base for an umbrella of claim 19 further including means for locking said receptacle in a selected angle relative to said pair of intersecting elongated members.

* * * * *